March 22, 1966 W. H. AMENT 3,241,261
ARTIFICIAL FISHING LURE
Filed March 23, 1964
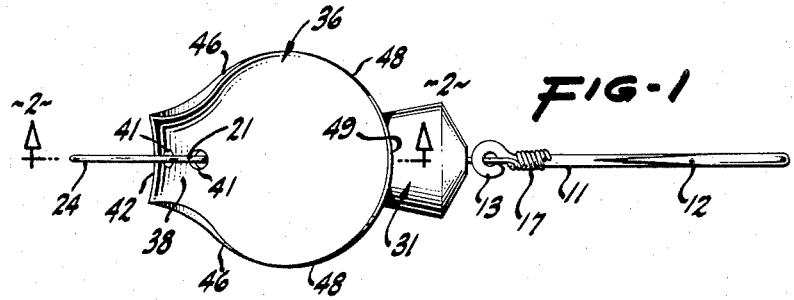
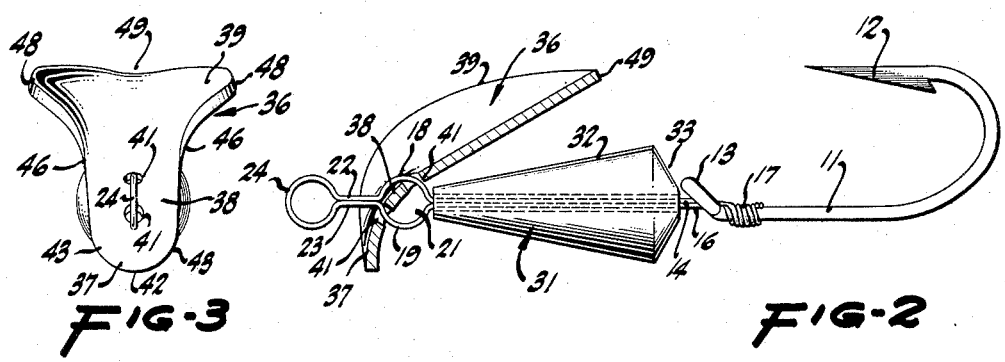
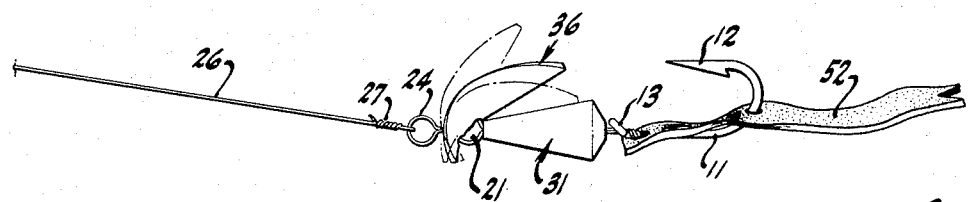
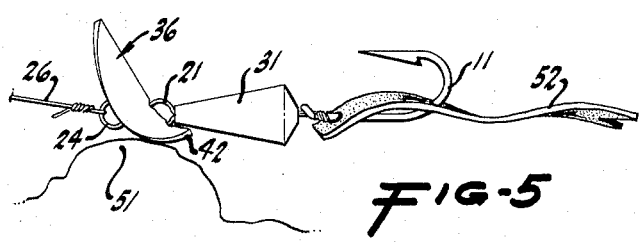
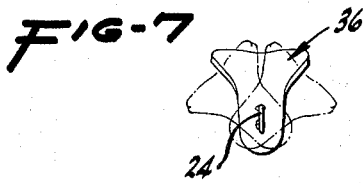
INVENTOR.
WESTON H. AMENT
BY Julian Caplan
ATTORNEY

United States Patent Office 3,241,261
Patented Mar. 22, 1966

3,241,261
ARTIFICIAL FISHING LURE
Weston H. Ament, % Ament-Douglass Manufacturing
Corp., 2896 Bay Road, Redwood City, Calif.
Filed Mar. 23, 1964, Ser. No. 353,764
6 Claims. (Cl. 43—42.03)

This invention relates to a new and improved artificial fishing lure.

A principal feature of the present invention is the provision of a lure having a hook connected by a wire to the line, and having a blade attached to the wire, and further having a weight through which a portion of the wire passes. Two separate holes are formed in the blade and the wire passes through both holes, thereby restricting wobbling movement of the blade relative to the wire and hook.

A principal feature of the invention is the fact that the lure has the appearance of a spinner-type lure but does not have a spinning action of the blade relative to the hook. Since the blade does not revolve, the line is not twisted.

Another principal feature of the present invention is the fact that the hook and line are connected independently of the lure blade and that the attaching wire intermediate the hook and the line engages the lure blade so that a unitary device is produced. Thus, as hereinafter described in detail, a fish hook and the line are interconnected by a link. The link is formed with an eye which passes through a pair of holes in the blade. By the construction heretofore described, the pull of the line is transmitted to the hook and the blade is independent thereof. The foregoing construction differs from conventional blade type lures wherein the line is customarily attached to one end of the blade and the hook to another end thereof. By reason of the fact that the link passes through two holes in the blade, the blade is kept from rotating beyond certain limits.

Another feature of the invention is the construction of the blade wherein there is provided a downturned nose which makes the lure inherently unstable so that as it is retrieved, a series of rolls is produced.

The blade has a broad trailing stabilizer portion which causes the lure to recover. The combination of the nose and trailing portion produces a series of rolls and partial rolls which imparts to the lure a fluttering action which is particularly effective in luring game fish.

Still another feature of the invention is the fact that the lure is self-righting and hence inherently heads in the proper direction after a cast has been made.

A still further feature of the present invention is the fact that, if the forward edge of the blade snags on an obstruction, the blade pitches forward and thus clears itself from the obstruction.

A still further feature of the invention is the provision of a weight which surrounds the wire link and has a tapered shape which enhances the action of the blade.

A still further feature of the invention is the fact that pork rind, bucktail, or the like, may be applied to the hook. Such additional material does not affect the action of the lure.

An important feature of the invention is the fact that the barb of the hook is maintained in upright position, which is an effective position for catching fish and provides an inherent resistance to snagging. This position of the barb is maintained despite the fluttering action of the blade by reason of the construction of the lure.

Other objects of the present invention will become apparent upon reading the following specification and referring to the accompanying drawings in which similar characters of reference represent corresponding parts in each of the several views.

In the drawings:

FIG. 1 is a top plan view of the lure.

FIG. 2 is a side elevational view with the blade shown in section substantially along the line 2—2 of FIG. 1.

FIG. 3 is a front elevational view.

FIG. 4 is a schematic view in reduced scale, showing the lure with a pork rind streamer applied. The blade is shown in solid lines in normal or intermediate position and in dotted lines in positions of extreme displacement about a horizontal transverse axis.

FIG. 5 is a view similar to FIG. 4, showing forward tipping of the blade to clear an obstruction.

FIG. 6 is a top plan view, showing in solid lines the normal or intermediate position of the blade and in dotted lines the limits of sideward movement about a vertical axis.

FIG. 7 is a front elevational view, showing the blade in extreme positions of movement about the longitudinal horizontal axis.

The lure, which is the subject of this invention, preferably employs a single barb hook 11, having barb 12 upright and forwardly pointing. Eye 13 on the forward end of the shank 11 of the hook receives the rearward end of double wires 14 to 16, the rearward ends of which are wrapped around the shank of hook 11 immediately rearwardly of eye 13 in a wrap 17. Wires 14, 16 extend forwardly in an extended stretch and are then bent oppositely-outwardly in semi-circular bends 18, 19, respectively, to form a rearward eye 21, thence forwardly in straight stretches 22, 23, respectively, of lesser length than stretches 14, 16, but aligned therewith and then in a forward circular eye 24 at the forward end of the lure. The leader 26, line or an intermediate connector (not shown) may be attached to eye 24 by means of knot 27.

Surrounding stretches 14, 16, between eye 21 and eye 13, is a weight 31 of brass or other relatively heavy material. Wires 14, 16 pass through a longitudinal aperture in weight 31. In external shape, weight 31 has a rearwardly-outwardly tapering body 32 and a rearward end 33, which is of a frusto-conical shape. The slope of the side 32 with reference to a plane through the juncture of sides 32, 33 is considerably more steep than the side of the accompanying portion 33 to produce the shape best shown in FIG. 2.

Forward of weight 31 is blade 36. Blade 36 comprises a normally downwardly extending dished forward portion or nose 37 which converges to a relatively thin waist 38 and then diverges to a depending trailing or recovery portion 39. At waist 38 is a pair of holes 41 through which loops 18, 19 of eye 21 pass. It will thus be seen that line 26, wires 14, 16 and hook 11 comprise a single train, but that blade 36 is fastened thereto by reason of eye 21 passing through holes 41.

Forward dished nose 37 originates in a rounded bottom tip 42 which in front elevation has side edges 43 which extend on either side upwardly and slightly outwardly to waist 38. In side elevation nose 37 is concave-convex. Waist portion 38 is approximately semicircular in transverse section. Trailing portion 39 is upwardly concave and its edges 46 converge outwardly and upwardly to its widest portion 48 and then terminate in a rounded and downwardly bent end 49. The width at the widest portion 48 is approximately twice the width of waist 38. The trailing portion 49 is considerably flatter than the deeply concave nose 37.

During retrieval of the lure, forward dished nose 37 makes blade 36 inherently unstable and causes it to wobble towards one side or the other. Note FIG. 6, showing the blade in three extreme positions. The fact that the half loops 18, 19 of eye 21 pass through holes 41 and weight 38, limits the amplitude of fluttering movement of blade 36. In addition, this construction prevents rotation of blade 36 relative to hook 11 and hence deters twisting of line 26. In addition to fluttering movement about a vertical axis the blade also flutters about a longitudinal-horizontal axis as is shown by the three positions of the blade in FIG. 7.

Further, the blades will flutter about a transverse horizontal axis, as is shown by the three positions of the blade in FIG. 4.

In use, of course, the movement of blade 36 about the axes, illustrated in FIGS. 4, 6 and 7, is simultaneous and the composite result is an irregular fluttering action which is extremely effective in catching fish. At all times, however, the hook 12 remains upright in the position best shown in FIG. 2, so that although the lure functions in many respects similar to a spinner, there is no turning or spinning of the hook nor twisting of the line.

The use of weight 31 on the lure tends to cause the lure to sink in the water and hence the lure tends to travel low. The tapered shape of the weight enhances the action of the blade. Further, as shown in FIG. 4, the weight 31 limits rotation of blade 36 in a clockwise direction.

Turning now to FIG. 5, in the event that the nose 37 strikes an obstruction 51, such as an underwater log, rock, or the like, any tendency of the blade 36 to snag is reduced in that the blade 36 may pivot in a counter-clockwise direction, as viewed in FIG. 5, to clear itself.

A piece of pork rind 52 may be attached to the hook 12, as is best shown in FIGS. 4 and 5. In addition to pork rind, bucktail, skirts, and the like, may be attached to the hook by winding around the shank of the hook, or passing the hook through the rind, or similar material. The use of these additives does not affect the action of the lure.

Although the foregoing invention has been described in some detail, by way of illustration and example for purposes of clarity of understanding, it is understood that certain changes and modifications may be practiced within the spirit of the invention and scope of the appended claims.

What is claimed is:

1. An artificial lure comprising an apertured blade having a narrow central waist, a downwardly extending concavo-convex nose forwardly of said waist, and a broad, relatively flat upwardly extending recovery portion rearwardly of said waist; said waist being formed with a pair of apertures disposed spaced along the longitudinal center line of said blade, said nose extending downwardly forwardly and said recovery portion extending upwardly rearwardly of said apertures during normal movement of said lure through the water; a hook disposed to the rear of said blade, an integral elongated link having an enlarged first eye at the forward end of the line and an enlarged second eye disposed rearward of said first eye, and means attaching said link to said hook a substantial distance rearward of said second eye, said second eye passing through both said apertures, said blade being free to flutter relative to said link and hook about said apertures as a center, said second eye passing through both said apertures limiting the vertical and horizontal movements of said blade relative to said link and hook.

2. A lure according to claim 1, in which said link comprises a unitary wire bent into parallel legs, said wire commencing at the forward end of said link in said first eye, both legs extending parallel and contiguous in short rearward stretches rearward of said first eye, both legs looped out rearward of said short rearward stretches to form said second eye, and both legs extending parallel and aligned with said short rearward stretches in elongated rearward stretches behind said second eye, said means located at the rearward end of said elongated rearward stretches.

3. A lure according to claim 2, in which said hook has a shank, said shank and both said rearward stretches being substantially aligned.

4. A lure according to claim 3, in which said hook has a barb on the same side of said shank as said recovery portion.

5. A lure according to claim 2, which further comprises an elongated weight, said elongated rearward stretches extending through said weight.

6. A lure according to claim 5, in which said weight is conical, increasing in diameter rearwardly.

References Cited by the Examiner

UNITED STATES PATENTS

| | | | |
|---|---|---|---|
| 1,250,189 | 12/1917 | Kinsey | 43—42.24 |
| 1,383,546 | 7/1921 | Knowles | 43—42.36 |
| 1,644,151 | 10/1927 | Rodgers | 43—42.49 X |
| 2,780,884 | 2/1957 | Hadfield | 43—42.49 X |

FOREIGN PATENTS 481,909  6/1953  Italy.

SAMUEL KOREN, *Primary Examiner.*

ABRAHAM G. STONE, *Examiner.*